US007614706B2

(12) United States Patent
Meggiolan et al.

(10) Patent No.: US 7,614,706 B2
(45) Date of Patent: *Nov. 10, 2009

(54) COMPOSITE BICYCLE RIM AND METHOD FOR PRODUCING IT

(75) Inventors: Mario Meggiolan, Vicenza (IT); Maurizio Passarotto, Rovigo (IT)

(73) Assignee: Campagnolo S.r.l., Vicenza (IT)

( * ) Notice: Subject to any disclaimer, the term of this patent is extended or adjusted under 35 U.S.C. 154(b) by 102 days.

This patent is subject to a terminal disclaimer.

(21) Appl. No.: 10/913,641

(22) Filed: Aug. 6, 2004

(65) Prior Publication Data

US 2005/0062337 A1  Mar. 24, 2005

(30) Foreign Application Priority Data

Aug. 11, 2003   (EP)   ................................. 03425547

(51) Int. Cl.
B60B 5/02   (2006.01)

(52) U.S. Cl. ............................ 301/95.102; 301/95.106; 301/95.107

(58) Field of Classification Search ............ 301/64.701, 301/64.702, 64.703, 95.102, 95.103, 95.104, 301/95.106, 95.107
See application file for complete search history.

(56) References Cited

U.S. PATENT DOCUMENTS

| 4,146,274 | A |   | 3/1979  | Lejeune |              |
|-----------|---|---|---------|---------|--------------|
| 4,173,992 | A | * | 11/1979 | Lejeune | ... 152/381.3 |
| 4,376,749 | A | * | 3/1983  | Woelfel | ..... 264/258 |
| 4,614,678 | A |   | 9/1986  | Ganga   |              |
| 4,702,527 | A | * | 10/1987 | Kawano  | ... 301/35.632 |
| 4,749,235 | A | * | 6/1988  | McDougall | ... 301/64.703 |
| 4,832,414 | A | * | 5/1989  | Jones   | ... 301/64.703 |
| 4,983,430 | A | * | 1/1991  | Sargent | ..... 428/34.1 |
| 5,073,315 | A | * | 12/1991 | Bertelson | ..... 264/490 |
| 5,512,119 | A | * | 4/1996  | Takezawa et al. | ..... 156/171 |
| 5,534,203 | A | * | 7/1996  | Nelson et al. | ..... 264/101 |
| 5,540,485 | A | * | 7/1996  | Enders  | ..... 301/104 |
| 5,549,360 | A | * | 8/1996  | Lipeles | ... 301/64.703 |
| 5,919,044 | A | * | 7/1999  | Sicurelli et al. | ..... 433/220 |
| 5,960,834 | A | * | 10/1999 | Sekido et al. | ..... 138/125 |
| 6,086,161 | A |   | 7/2000  | Luttgeharm et al. | |
| 6,190,481 | B1 | * | 2/2001  | Iida et al. | ..... 156/175 |
| 6,228,474 | B1 | * | 5/2001  | Kishi et al. | ..... 428/297.4 |
| 6,347,839 | B1 | * | 2/2002  | Lew et al. | ..... 301/95.102 |
| 6,593,255 | B1 | * | 7/2003  | Lawton et al. | ..... 442/59 |
| 6,761,847 | B2 | * | 7/2004  | Meggiolan | ..... 264/257 |
| 6,926,370 | B2 | * | 8/2005  | Spoelstra | ... 301/64.703 |
| 6,991,300 | B2 | * | 1/2006  | Colegrove | ... 301/95.103 |
| 7,032,769 | B2 | * | 4/2006  | Iida et al. | ..... 220/591 |
| 2006/0181140 | A1 | * | 8/2006  | Mercat et al. | ..... 301/95.101 |

FOREIGN PATENT DOCUMENTS

| DE | 44 25 592 A1 | 1/1996 |
| EP | 0 324 630 A2 | 1/1989 |
| EP | 1 231 077 A  | 2/2002 |
| RU | 2 096 188 C1 | 7/1996 |

* cited by examiner

Primary Examiner—Russell D Stormer
(74) Attorney, Agent, or Firm—Volpe and Koenig, P.C.

(57) ABSTRACT

A bicycle rim made of composite material has structural fibers incorporated in a polymeric material. The rim has at least one circumferential reinforcement element based on unidirectional structural fibers extending at a respective intersection of walls of the rim, the direction of the structural fiber being circumferential.

39 Claims, 8 Drawing Sheets

Figure 1:
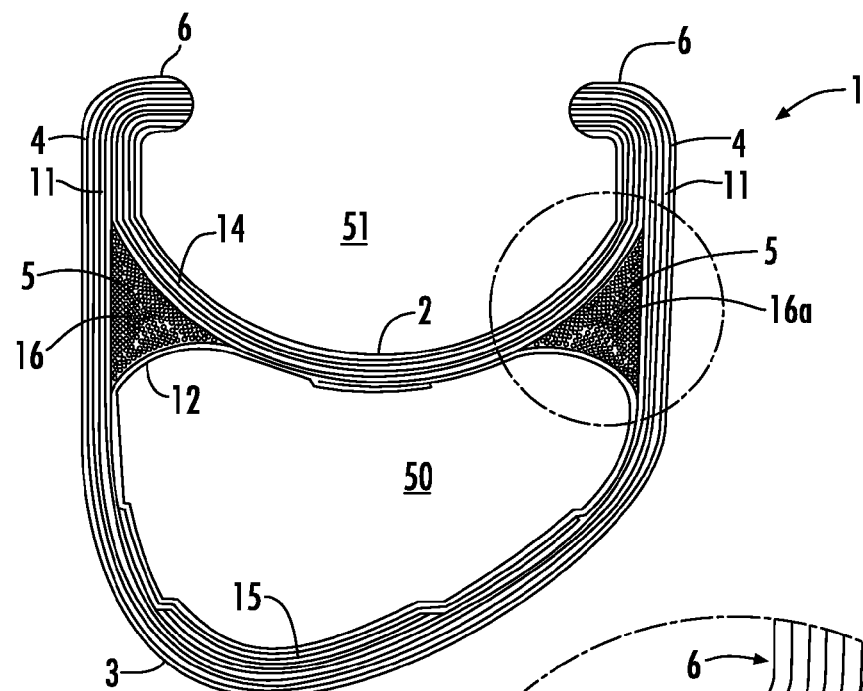

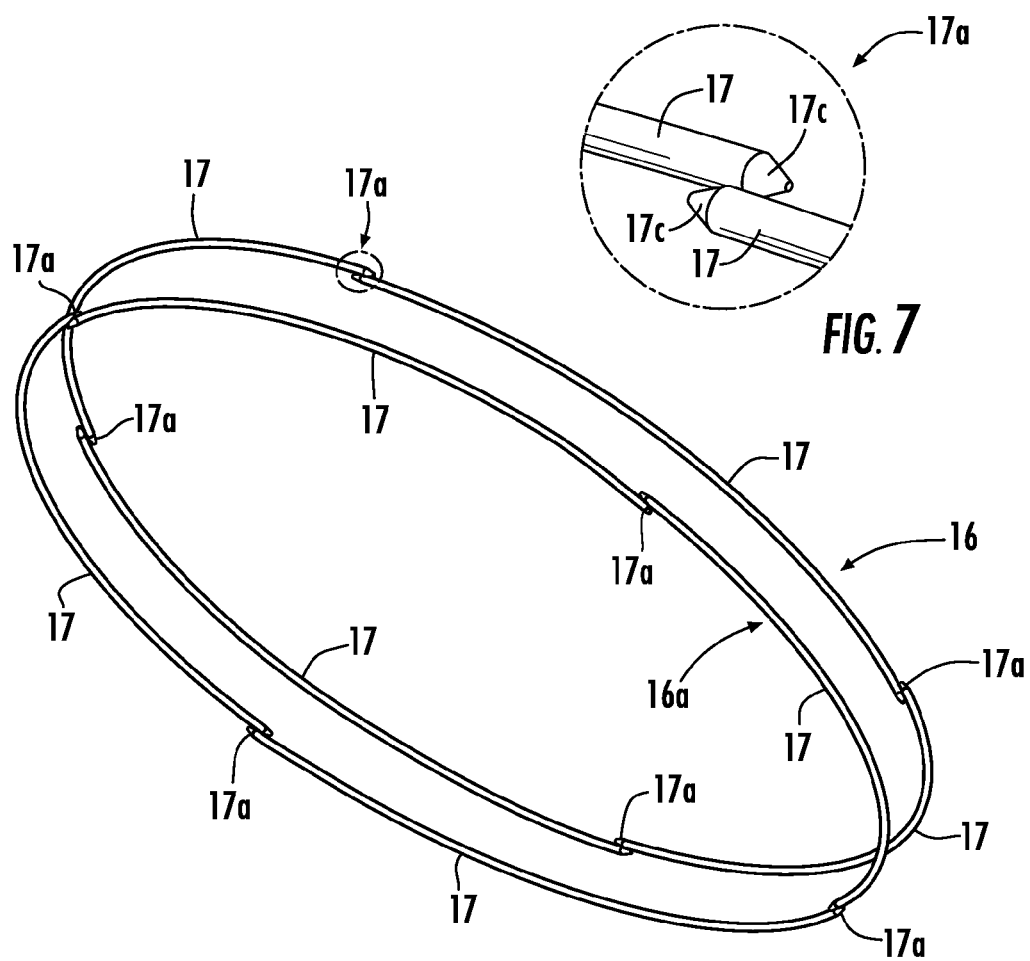
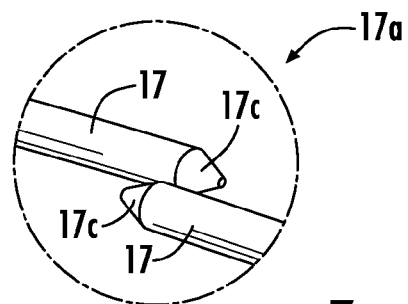
FIG. 7
FIG. 6

COMPOSITE BICYCLE RIM AND METHOD FOR PRODUCING IT

FIELD OF INVENTION

The present invention concerns a bicycle rim made of composite material based on structural fibers incorporated in a polymeric material, as well as a method for producing such a rim.

BACKGROUND

Bicycle rims having a single channel, at the side walls or wings of which the beads of the tire are coupled through protruding lips of the wings, and on the bottom of which a plurality of holes are made for the attachment of respective spokes, are known.

In order to increase the structural stiffness and to reduce the deformability from side loads, bicycle rims having a cross-section that defines a radially outer circumferential channel for tire coupling and an essentially hollow, radially inner circumferential body region are also known. The tire coupling channel and the body region are separated by a wall indicated in the field and hereafter as "upper bridge."

Although the channel is subject to standards or shape and tolerance restrictions in view of its coupling with the tire, the radially inner region can have various configurations, provided that it offers a suitable clamping surface for the spokes and provided that the conflicting requirements of sufficient structural stiffness and low weight are adequately satisfied.

Typical configurations of a bicycle rim of the second known type, to which the present invention refers, include an inverted A-shaped cross-section, i.e. where the radially inner body region is formed of a single chamber, defined by the upper bridge, two side walls, and a radially inner circumferential wall also called "lower bridge." The chamber can have an essentially rectangular cross-section, i.e. wherein the side walls are substantially parallel to the middle plane of the rim, an essentially trapezoidal cross-section that is symmetrical with respect to the middle plane of the rim, i.e. wherein the side walls are oblique, or else an essentially asymmetrical trapezoidal cross-section, i.e. wherein a first side wall substantially extends in a plane parallel to the middle plane of the rim and a second wall extends obliquely.

In other configurations, typical of rims obtained by extrusion and calendering, but that can also be made of structural fiber-based composite material, the radially inner region is provided with one or more partition walls, extending substantially parallel to the upper bridge or substantially transversal to it, so as to define two or more circumferential chambers.

EP 1 231 077, the description of which is incorporated herein by reference, describes a method for producing a bicycle rim, and such a rim, of the type which has an inner peripheral wall, an outer peripheral wall, two side walls connecting them, and two circumferential wings for anchoring a tire extending outwards from the two sides of the peripheral outer wall. The manufacturing method comprises the steps of: applying onto the inner part of a mold a certain number of layers of plies of structural fibers incorporated in a plastic material matrix, intended to form the inner wall, the outer wall, the two side walls and the wings; arranging an inflatable bag over the layers; folding a first number of layers over the inflatable bag; applying at least one core over the folded layers; folding a second number of layers over the core; applying the outer part of the mold to enclose the layers; inflating the inflatable bag to press the layers against the mold; increasing the temperature of the mold to a value sufficient for the reticulation of the plastic material matrix; removing the rim from the mold and removing the core, obtaining a single-piece rim made of a structural fiber material. Apart from first additional layers that may be applied to increase the thickness of the outer wall and/or of the two wings, it is provided that second additional layers may be applied to fill the side regions of the outer wall from which said wings depart, said second additional layers being, in particular, folded or wound plies of structural fibers.

The Applicant has experimentally found that, in a rim of the type described in EP 1 231 077, the intersection regions among the upper bridge, the side walls and the wings are subjected to breaking following the application of a certain stress onto the wings themselves, in particular in the tire burst test. Analogous breaking should therefore be expected in the case of impacts to the rim, as caused for example by stones, falling and the like during the use of a bicycle equipped with such a rim, as well as between other walls of the rim in the case of rims made by an analogous process, but having a body region with a more complex cross-section, for example with many circumferential chambers.

The technical problem that the current invention addresses is that of avoiding such a drawback of the prior art, while improving the overall strength to stress, in particular to stresses substantially in the axial direction, of the bicycle rim in general and of the intersection zone among the upper bridge, the side walls and the wings in particular.

SUMMARY

Such a technical problem is solved by providing a reinforcement element at the intersection zone between walls of the rim, in particular between the upper bridge, one or each side wall and respectively one or each wing, said reinforcement element comprising unidirectional structural fibers extending in the circumferential direction. The unidirectional structural fibers fulfill the dual role of filling the space between adjacent layers in the intersection zone between walls, in a much more effective way with respect to the solution proposed by EP 1 231 077 (which corresponds to co-pending U.S. application Ser. No. 10/073,411 (Publication No. US2002108249) to Meggiolan) and of increasing the strength to stresses of the intersection zone, by distributing them along the entire circumference of the rim thanks to the directionality of the unidirectional structural fibers themselves.

In a first aspect thereof, the present invention concerns a bicycle rim made of composite material based on structural fibers incorporated in a polymeric material, comprising at least one circumferential reinforcement element of unidirectional structural fibers extending at a respective intersection of walls of the rim, the direction of the structural fibers being circumferential.

BRIEF DESCRIPTION OF THE DRAWING(S)

Figure 8:
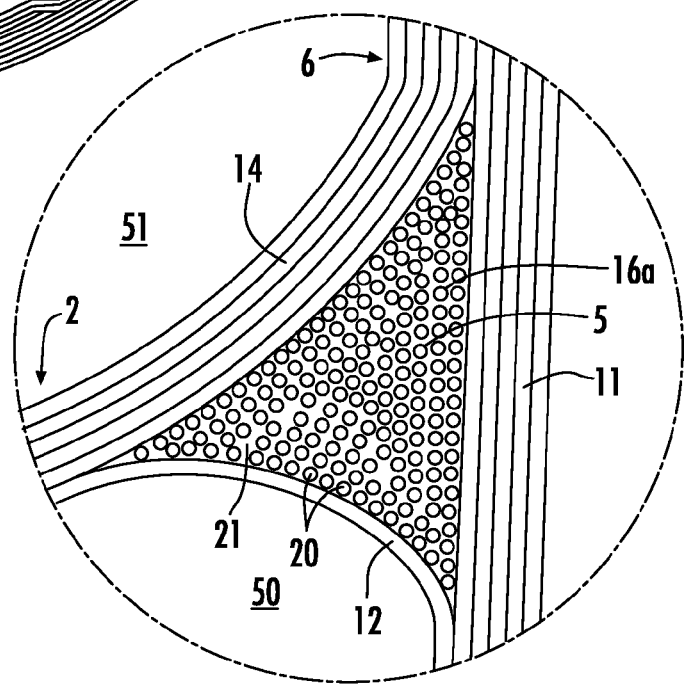
Figure 2:
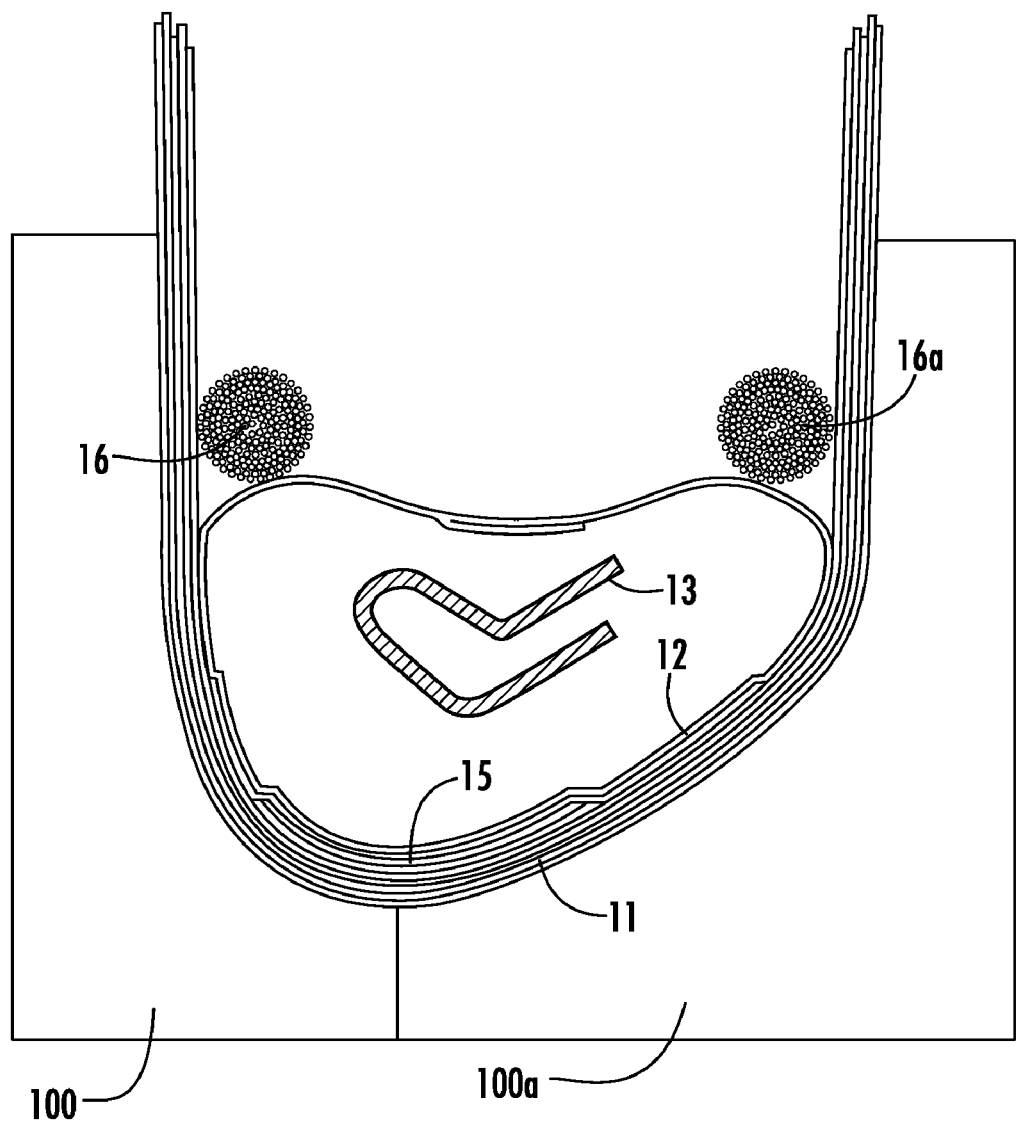
Figure 2A:
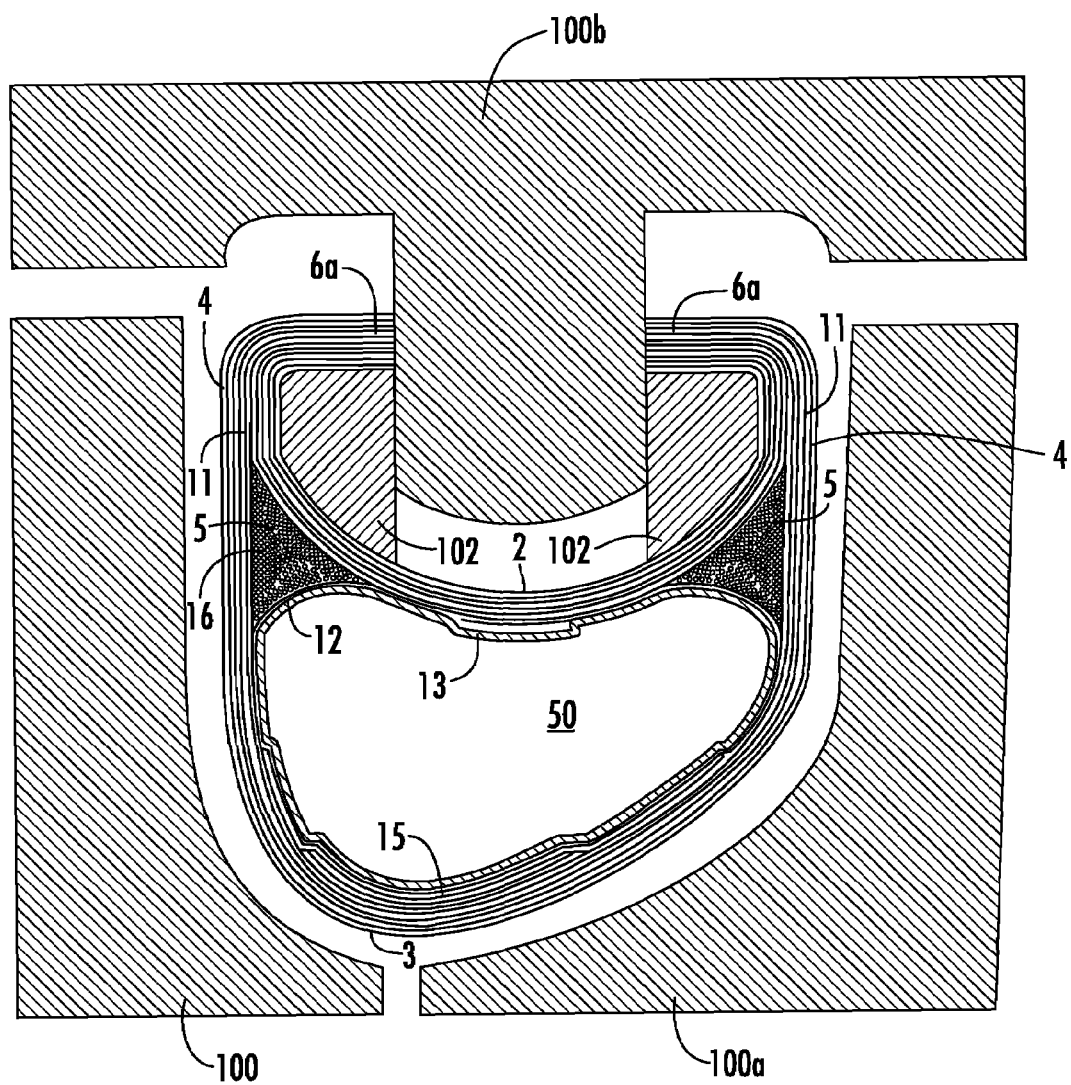
Figure 3:
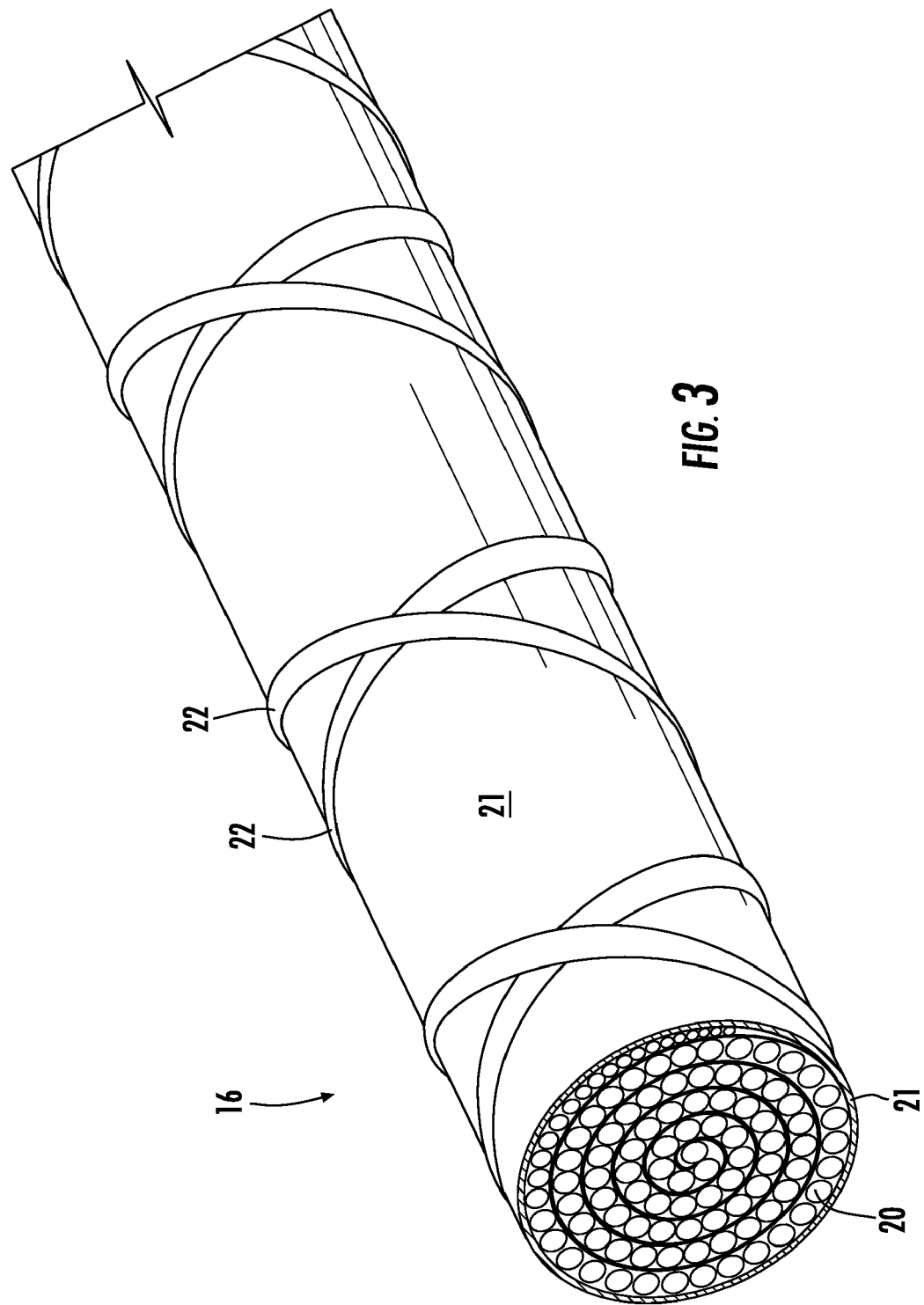
Figure 4:
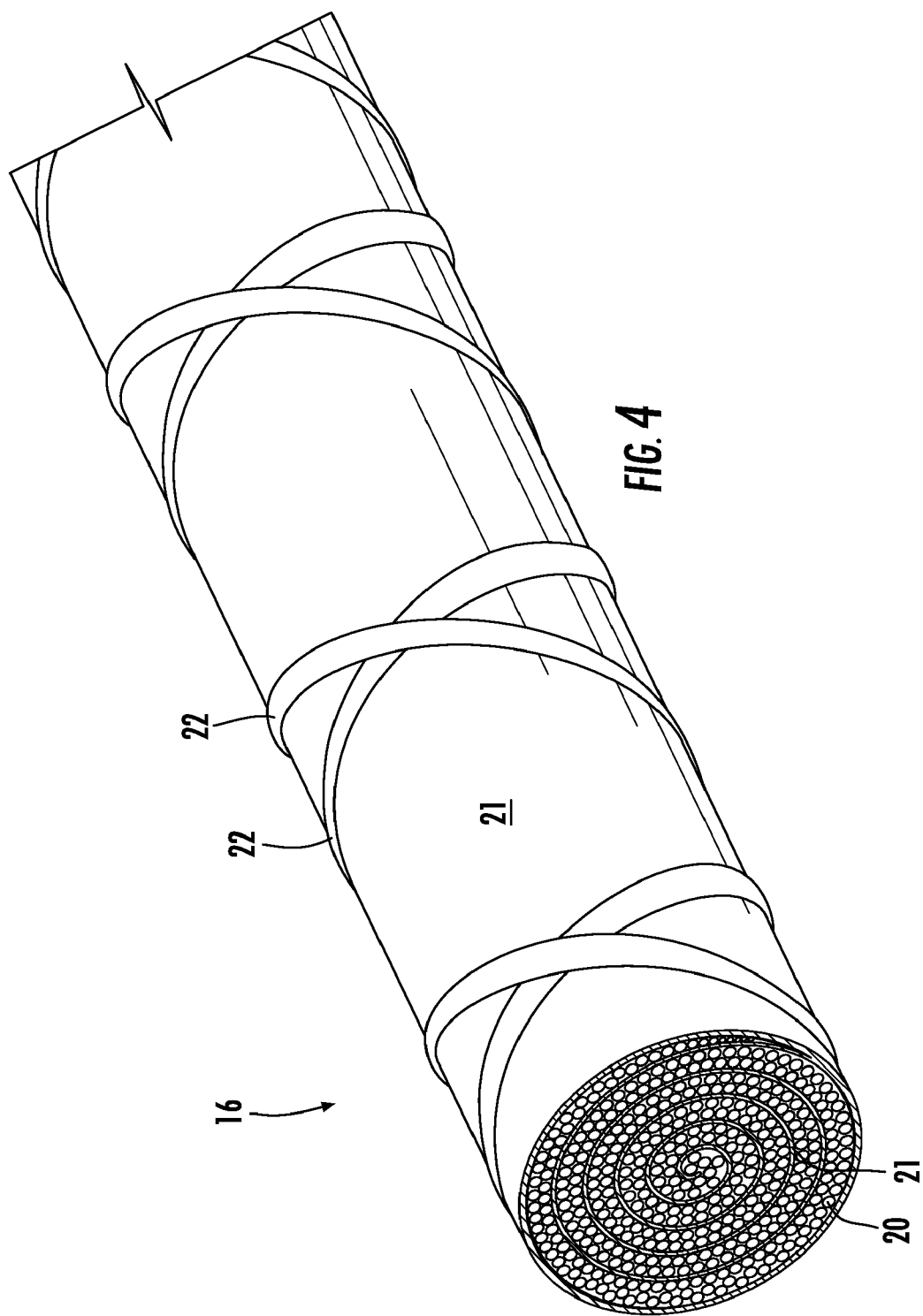
Figure 5:
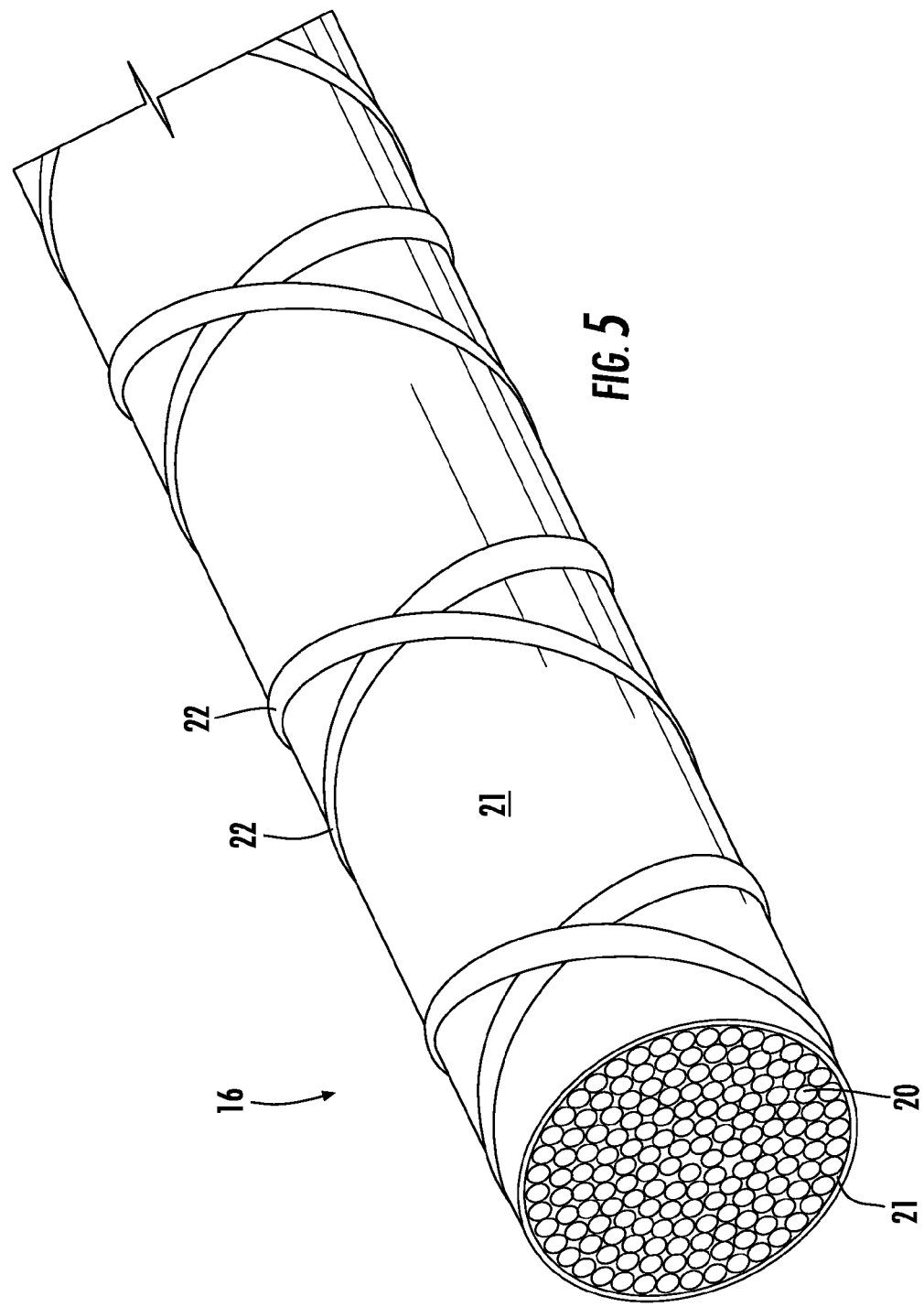
Figure 9:
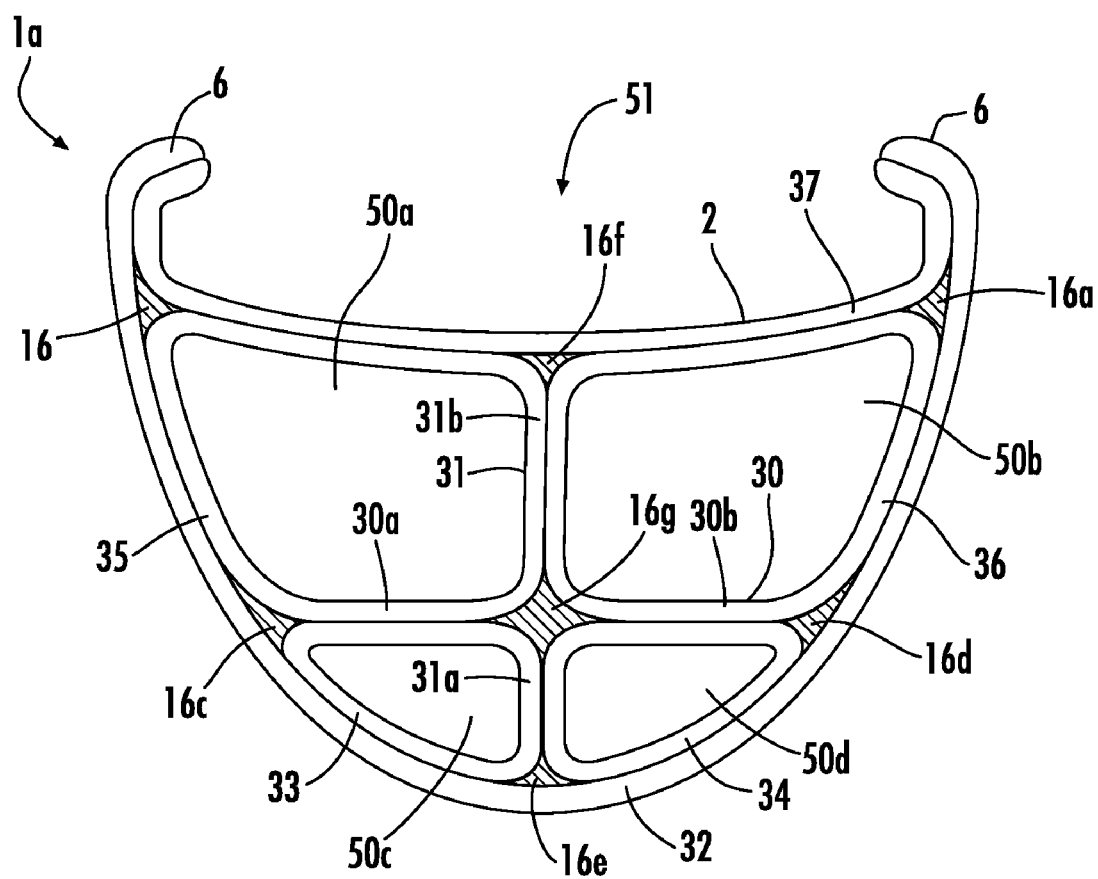

Further characteristics and advantages of the present invention shall become clearer from the following detailed description of some preferred embodiments thereof, given with reference to the attached drawings. In the drawings:

FIG. 1 illustrates a cross-section view of a bicycle rim according to the present invention, FIG. 2 illustrates a cross-section view of the bicycle rim during an intermediate molding step, inserted in a mold, FIG. 2A illustrates a cross-section view of the bicycle rim during a later intermediate molding step, inserted in a mold FIG. 3 illustrates a first embodiment of a reinforcement element according to the invention, FIG. 4 illustrates a second embodiment of a reinforcement element according to the invention, FIG. 5 illustrates a third embodiment of a reinforcement element according to the invention, FIG. 6 illustrates a preferred arrangement of portions of two reinforcement elements according to the invention, FIG. 7 illustrates an enlarged detail of FIG. 6, FIG. 8 illustrates an enlarged detail of FIG. 1, and FIG. 9 illustrates a cross-section view of a bicycle rim having a plurality of reinforcement elements according to the invention.

DETAILED DESCRIPTION OF THE PREFERRED EMBODIMENT(S)

In a presently preferred embodiment, a bicycle rim is produced according to the method described hereafter.

FIGS. 1, 2, and 2a show an inner half-mold formed by two portions 100, 100a, and a top portion 100b. A first layer 11 has five plies formed of woven carbon fibers impregnated with thermosetting resin. The weft and warp directions of the plies preferably form an angle of +45° and −45° with the circumferential direction.

Over the first layer 11, in a zone intended for the attachment of spokes of the wheel of the bicycle, an additional layer 15 of three plies is laid. These plies have decreasing width, so as to adapt to the inner curvature of the rim, and are made of woven carbon fibers impregnated with thermosetting resin. The weft and warp directions of the plies preferably form an angle of +45° and −45° with the circumferential direction.

Over the first layer 11 and the additional layer 15, a second layer 12 of a ply of woven carbon fibers impregnated with thermosetting resin is arranged. The weft and warp directions of the ply preferably form an angle of +45° and −45° with the circumferential direction. As shown, the second layer 12 defines a substantially closed inner circumferential chamber of the rim 1. Portions of the first 11 and second 12 layers are joined and run parallel to form a first wall 3 of the rim 1. The first wall 3 of the illustrated embodiment comprises a radially inner wall, or lower bridge and oblique wall of the rim 1.

A third layer 14 is joined with and runs parallel to the second layer 12 along portions thereof to form a second wall 2 of the rim 1. As shown in FIGS. 1, 2A, and 8, the second wall is the upper bridge 2 of the rim 1, defining an inner surface of a tire coupling channel. A portion of the third layer 14 is further joined to and runs parallel with at least one portion of first layer 11 to form at least one third wall 4 of the rim 1. In the illustrated embodiment, the third 14 and first 11 layers join to form two sidewalls 4 that extend radially outward from the rim body and include axially inward extending wings 6 for coupling a tire to the rim.

As shown in FIGS. 1, 2A, and 8, the first 11, second 12, and third 14 layers enclose therebetween a space 5 where the first 3, second 2, and third 4 walls meet. Each of the layers 11, 12, 14 defines a respective outer wall that bounds the space 5, which encloses a reinforcement element 16. The space 5 is located between portions of the layers where the first 11 and second 12, second 12 and third 14, and third 14 and first 11 layers diverge.

The expression "ply composite material" refers to a composite material essentially in two-dimensional form, in which the structural fibers, in general having a length higher than 50 millimeters, can be arranged in the polymeric material both in an ordered way to form a typical woven structure, and in a random manner, for example in the form of thin sheets or pieces of fiber in general having a length of between 1 and 100 millimeters that are randomly arranged.

The number of plies of composite material constituting each layer is chosen by taking the conflicting requirements of thickness and strength of the rim on the one hand and of low weight on the other hand into account.

Over the second layer 12 an inflatable bag 13, shown deflated in FIG. 2, is arranged (fully described in EP 1 231 077) and intended, once inflated as shown in FIG. 2A, to apply a pressure of the layers against the walls of the mold and against wing formation elements 102 to form a substantially closed chamber 50 in the radially inner circumferential body region of the bicycle rim.

The ply that constitutes the second layer 12 is folded over the inflatable bag.

The reinforcement element 16 is arranged over the folded second layer 12 on the opposite side to the oblique wall of the half-mold 100, 100a, where the second layer 12 thus folded departs from the first layer 11.

In a first embodiment, shown in FIG. 3, the reinforcement element 16 comprises a substantially cylindrical core obtained from a band 20 of unidirectional carbon fibers impregnated with thermosetting resin, spirally wound around the direction defined by the unidirectional carbon fibers.

The thermosetting resin of the reinforcement element 16 has the same composition of the thermosetting resin of the composite material of the rim 1 and therefore it reticulates with the same thermal cycles used for the molding of the rim.

The wound band core 20 is enclosed by a film 21 of gluing substance, like for example a thermosetting epoxy glue.

The wound band core 20 and the film of gluing substance 21 are also wrapped by containment means represented in FIG. 3 by spirally wound unidirectional fibers 22.

In a second embodiment, illustrated in FIG. 4, the band 20 of unidirectional carbon fibers impregnated with thermosetting resin is spirally wound together with the film of gluing substance 21, around the direction defined by the unidirectional carbon fibers.

In a third embodiment, illustrated in FIG. 5, the reinforcement element 16 consists of a bundle of loose unidirectional structural fibers 20' wrapped by a film 21 of gluing substance.

The unidirectional structural fibers 20' are impregnated with thermosetting resin.

Optionally, a second reinforcement element 16a is arranged over the folded second layer 12 on the side of the oblique wall of the half-mold 100, 100a, where the second layer 12 thus folded departs from the first layer 11.

In the case of a symmetrical bicycle rim (not shown), two reinforcement elements 16, 16a are arranged in a symmetrical position with respect to the circumferential middle plane of the rim.

More specifically, with reference to FIGS. 6 and 7, each reinforcement element 16, 16a comprises a certain number of portions 17, four in the illustrated example, wherein the portions 17 of a reinforcement element 16 are arranged circumferentially staggered with respect to the portions 17 of the reinforcement element 16a so that the joints 17a between adjacent ends 17c of the portions 17, which represent points of lower reinforcement of the rim, are distributed, preferably uniformly, along the circumference of the rim (in the illustrated case, the joints are spaced by 45° along such a circumference).

Moreover, the portions 17 of the reinforcement elements 16, 16a have the ends 17c tapered, in particular frusto-conical as illustrated in the enlargement of FIG. 7, and the portions 17 are arranged in the mold 100, 100a so that the adjacent ends of the portions 17 slightly overlap. The tapering of the ends 17c allows a thickness and an amount of fibers substantially equal to those along the length of the portions 17 to be maintained in the jointing zones 17a.

While a small number of portions has the advantage of reducing the jointing points between the ends of the portions, a great number of portions means a shorter length of each of them, so that the circumferential reinforcement element which they make up can more easily withstand the stresses in the radial outwards direction that occur during the molding operation.

Going back to the description of the manufacturing method, the third layer 14 of five plies of woven carbon fibers impregnated with thermosetting resin is laid over the folded second layer 12 and over the reinforcement element(s) 16, 16a. The weft and warp directions of the plies form an angle of +45° and −45° with the circumferential direction.

One or two suitably shaped elements (not shown, but fully described in EP 1 231 077) intended to shape a tire coupling channel 51 and in particular tire coupling wings 6, are arranged over the third layer 14 and over the reinforcement elements 16 and 16a, if any.

The first and the third layer 11, 14 are folded over the shaped wing formation element(s) 102.

The mold is then closed and subjected to a temperature profile suitable for the reticulation of the thermosetting resin. At the same time, the inflatable bag 13 is inflated to a pressure suitable for pressing the layers 11, 12, 15 against the walls of the mold and against the wing formation elements 102. These in turn apply a suitable pressure, for example being formed of heat expandable material or suitably elastic material, as described e.g. in EP 1 231 077.

As for the reinforcement element(s) 16 and 16a, if any, during the molding cycle, due to the pressure and the temperature, the gluing substance 21 melts and distributes between the unidirectional structural fibers 20, 20' throughout the space defined between the layers 11, 12, 14, by mixing with the thermosetting resin with which the unidirectional structural fibers 20 are impregnated.

At the same time, the unidirectional fibers 20, 20' move due to the pressures involved in the radial and axial direction, thus filling, together with the gluing substance coming from the film 21, the space between the walls of the rim.

Because of the helical containment fibers 22, the unidirectional fibers 20, 20' remain confined in the intersection zone of the walls during the molding, which prevents their interpenetration in undesired zones, for example upwards with reference to the figures, between the layers 11 and 14 which define the wings 6.

Following the process of reticulation of the thermosetting resin and of curing of the gluing substance, the circumferential reinforcement element 16, 16a assumes a cross-section shaped according to the space between the intersecting walls, in other words substantially triangular as illustrated in FIG. 1 and in the enlargement of FIG. 8.

The provision of reinforcement elements 16, 16a formed by many portions 17 with partial overlapping of adjacent ends 17c of the portions allows the reinforcement elements 16, 16a to react to the pressure stresses from the inside during the molding process by moving in the radial direction outwards, without any longitudinal stresses of the unidirectional fibers 20, 20'. The overlapping zones are such that the adjacent ends 17c of the portions 17 substantially overlap for only the tapered zone after the molding process, so as to obtain, as stated above, a uniformity of the reinforcement element 16, 16a along the whole circumference.

The gluing substance of the film 21 has a high elongation at break coefficient, as well as a high intralaminar shear strength, higher than those of the thermosetting resin of the composite material of the rim.

The provision of a gluing substance having a high intralaminar shear strength hinders the reciprocal sliding of the plies of adjacent layers, like the layers 11 and 14, 11 and 12, 12 and 14. A gluing substance having a high elongation at break coefficient contributes to grant strength to the rim since it absorbs the torsional and compression stresses created between/among the walls of the rim and due, for example, to impacts.

The mold is then opened as shown in FIG. 2A and the bicycle rim 1 is removed. The wing formation element(s) 102 is(are) removed from the tire coupling channel 51, the inflatable bag 13 is deflated and possibly removed through a suitable opening, for example an opening provided for the tire inflation valve. Further post-molding machining shapes the substantially square shaped wings 6a shown in FIG. 2A to the desired rounded ends 6 shown in FIG. 1.

The present invention can equally be applied in bicycle rims with a more complex cross-section, as illustrated by way of an example by the rim 1a in FIG. 9, wherein a partition 30 parallel to the upper bridge 2 and a partition 31 perpendicular to it divide the radially inner circumferential body region into four chambers 50a-50d.

A rim with such a section can for example be formed of the layers 32-37, of which the various component plies are not illustrated, and which are arranged in the mold and folded around four chamber formation elements (not illustrated) in a totally analogous way to that which has been described above, as it shall be clear to those skilled in the art.

In particular, the layers differ from those of the embodiment shown in FIGS. 1, 2, and 2A in that four interior layers 33-36 are provided in place of the second layer 12, to define the four inner chambers 50a-50d, instead of a single inner chamber 50. The first 33 and second 34 interior layers are joined to form a first wall 31a, defining a lower segment of the partition 31 perpendicular to the upper bridge 2. The second 34 and third 36 interior layers are joined to form a second wall 30b, defining a segment of the partition 30 parallel to the upper bridge 2. The third 36 and fourth 35 interior layers are joined to form a third wall 31b, defining an upper segment of the partition 31 perpendicular to the upper bridge. The fourth 35 and first 33 interior layers are joined to form a fourth wall 30a, defining a second segment of the partition 30 parallel to the upper bridge.

In a rim with such a section, as an alternative or in addition to reinforcement elements 16 and 16a positioned at the intersections among the upper bridge 2, the tire coupling wings 6 and the side walls of the body region, one or more of two reinforcement elements 16c and 16d at the intersections between the parallel partition 30 and the outer wall of the body region, a reinforcement element 16e at the intersection between the perpendicular partition 31 and the outer wall of the body region, a reinforcement element 16f at the intersection between the perpendicular partition 31 and the upper bridge 2 and a reinforcement element 16g at the intersection between the two partitions 30, 31, within a space defined between the four interior layers 33-36, may be provided.

It should be noted that the reinforcement element 16g, if any, is essentially rhomboid-shaped in the finished rim.

Those skilled in the art will easily understand that the present invention must not be limited to the embodiments illustrated and described, but that it is susceptible to different variants, as illustrated hereafter again by way of an example and not of limitation of the invention.

The composite material based on structural fibers must not necessarily be made of woven ply with the weft and warp directions described above. Other orientations can be used, as well as non-woven plies, such as a polymeric material having structural fibers dispersed in it, for example in the form of thin sheets randomly arranged, and also non-ply material, for example structural fibers in the form of thin sheets or pieces of fiber having a length of between 1 and 100 millimetres randomly arranged in the mold.

Both for the ply composite material and for the reinforcement element, as an alternative to carbon fibers, glass fibers, boron fibers, aramidic fibers, ceramic fibers or a combination thereof can be used.

When ply composite materials are used, the layers 11, 12, 14, 15 can be formed by a different number of plies with respect to what has been indicated above.

There can be just one of the layers 12 and 14.

The layer 15 can be missing or arranged over the layer 12.

As far as each reinforcement element is concerned, in particular in the embodiment of FIG. 5, the unidirectional fibers can also be dry fibers, namely the thermosetting resin or other polymeric material can be missing.

As an alternative or in addition to thermosetting resin, the unidirectional fibers can be impregnated with gluing substance.

The film of gluing substance 21 can be missing.

Said helically wound unidirectional fibers 22 are preferably dry.

As an alternative to the helically wound unidirectional fibers 22, the containment means of the reinforcement element can consist of a net made of a suitable material or a of continuous coating of material permeable to the gluing substance.

The thermosetting resin of the reinforcement element 16 can be different from the thermosetting resin of the layers forming the bicycle rim.

More generally, both in the reinforcement element 16 and in the rim 1, as an alternative to the thermosetting resin a different polymeric material can be used, including thermoplastic materials. It is clear that in such a case no reticulation will take place, rather hardening of the thermoplastic material will take place.

It is believed that the stress of the wings and the consequent spreading apart and deformation thereof cause the reciprocal sliding of the plies of composite material of the adjacent layers which typically make up the wings, as better described herein. This sliding in turn determines the cracking of the polymeric material of the plies themselves. Reciprocal sliding and consequent cracking analogously occur at intersection points between/among walls other than the wings of the tire coupling channel. The provision of a gluing substance having a high intralaminar shear strength would hinder the reciprocal sliding of the adjacent plies of layers.

Advantageously, the polymeric material in which the unidirectional structural fibers of the circumferential reinforcement element are incorporated has the same composition of the polymeric material in which structural fibers of the walls of the rim are incorporated, so as to require the same heating profile, namely the same ranges of time and temperature for reticulation—in the case of thermosetting polymeric material—or for curing—in the case of thermoplastic polymeric material—during the molding cycle.

Preferably, the weight ratio between the polymeric material and the structural fibers of the at least one circumferential reinforcement element is substantially equal to or slightly lower than the weight ratio between the polymeric material and the structural fibers of the walls of the rim.

Advantageously, said at least one circumferential reinforcement element is obtained from a band of unidirectional fibers incorporated in a polymeric material, in particular in a thermosetting resin, spirally wound around an axis parallel to the direction of the structural fibers and covered with a film of gluing substance, subjected to a molding cycle with deformation in the cross-section.

The preparation of the reinforcement element is particularly simple and allows the amount by weight of unidirectional fibers which constitute it to be precisely controlled.

More specifically, following the molding cycle, the cross-section of said at least one circumferential reinforcement element is substantially triangular in the case of walls intersecting as a T, like in the case of the intersection among upper bridge, side wall and wing or in the case of the intersection between a partition wall of the body region and the outer wall (side walls or lower bridge) of the body region or the upper bridge, or else substantially rhomboidal-shaped in the case of four walls intersecting as a cross, as in the case of the intersection of two perpendicular partitions of the body region.

In a variant, in order to increase the quantity of gluing substance and its uniformity of distribution, said at least one circumferential reinforcement element can be obtained from a band of unidirectional fibers incorporated in a polymeric material, in particular a thermosetting resin, spirally wound, together with a film of binder, around an axis parallel to the direction of the structural fibers, subjected to a molding cycle with deformation in the cross-section.

As an alternative to the use of unidirectional fibers in a band, dry loose fibers or else loose fibers impregnated with polymeric material, in particular with thermosetting resin, can also be used.

The use of loose unidirectional fibers allows the filling factor of the spaces between the layers of structural material forming the intersecting walls to be increased.

What is claimed is:

1. A bicycle rim comprising a first, a second, and a third layer of composite material comprising structural fibers incorporated in a polymeric material,
   the first and second layers run parallel with each other at respective portions thereof to form a first wall of the rim, and diverge from each other at respective portions thereof, the second and the third layers run parallel with each other at respective portions thereof to form a second wall of the rim, and diverge from each other at respective portions thereof, and the third and first layers run parallel with each other at respective portions thereof to form a third wall of the rim, and diverge from each other at respective portions thereof,
   the diverging portions of the first, second and third layers each define a respective boundary of an enclosed space where the first, second, and third walls of the rim meet,
   the enclosed space enclosing a circumferentially extending reinforcement element of unidirectional structural fibers.

2. The bicycle rim of claim 1 wherein said unidirectional structural fibers of said circumferentially extending reinforcement element are embedded in a gluing substance.

3. The bicycle rim of claim 2 wherein said gluing substance has an elongation at break coefficient higher than that of the polymeric material.

4. The bicycle rim of claim 2 wherein said gluing substance has an intralaminar shear strength higher than that of the polymeric material.

5. The bicycle rim of claim 2 wherein said circumferentially extending reinforcement element is obtained from a band of unidirectional fibers incorporated in a polymeric material spirally wound around an axis parallel to the direction of the structural fibers and coated with a film of binder, subjected to a molding cycle with deformation in the cross-section.

6. The bicycle rim of claim 2 wherein said circumferentially extending reinforcement element is obtained from a band of unidirectional fibers incorporated in a polymeric material spirally wound, together with a film of gluing substance, around an axis parallel to the direction of the unidirectional structural fibers, subjected to a molding cycle with deformation in the cross-section.

7. The bicycle rim of claim 2 wherein said circumferentially extending reinforcement element is obtained from a band of loose unidirectional fibers impregnated with polymeric material, coated with a film of binder, and subjected to a molding cycle with deformation in the cross-section.

8. The bicycle rim of claim 1 wherein the unidirectional structural fibers of said circumferentially extending reinforcement element are incorporated in a polymeric material.

9. The bicycle rim of claim 8 wherein the polymeric material of said circumferentially extending reinforcement element has the same composition as the polymeric material of the bicycle rim.

10. The bicycle rim of claim 1 wherein said circumferentially extending reinforcement is substantially triangular in cross-section.

11. The bicycle rim of claim 1 wherein said circumferentially extending reinforcement element further comprises containment fibers of the unidirectional structural fibers, the containment fibers non-continuously extending on the outer surface of the circumferentially extending reinforcement element.

12. The bicycle rim of claim 11 wherein said containment fibers comprise a plurality of externally helically wound unidirectional structural fibers.

13. The bicycle rim of claim 1 wherein said circumferentially extending reinforcement element comprises at least one portion extending for an arc of a circumference of the bicycle rim.

14. The bicycle rim of claim 13 wherein adjacent ends of said at least one portion are tapered and slightly overlapped.

15. The bicycle rim of claim 13 wherein the circumferentially extending reinforcement element comprises a plurality of portions extending for an arc of circumference of the rim, and ends of one of the portions of said circumferentially extending reinforcement element are arranged circumferentially staggered with respect to ends of a second one of the portions of said circumferentially extending reinforcement element.

16. The bicycle rim of claim 13 wherein said circumferentially extending reinforcement element comprises two portions, each extending for an arc of circumference.

17. The bicycle rim of claim 13 wherein said circumferentially extending reinforcement element comprises four portions, each extending for an arc of circumference.

18. The bicycle rim of claim 1 wherein the first, second and third walls of the rim are respectively an upper bridge wall, a side wall of a body region of the bicycle rim, and a tire coupling wing wall.

19. The bicycle rim of claim 1 wherein the first layer defines an outer surface of a body region of the bicycle rim and wings of the bicycle rim, and the second layer defines an inner surface of a respective substantially closed radially inner circumferential chamber.

20. The bicycle rim of claim 10 further comprising an additional layer of composite material arranged at a spoke attachment zone.

21. The bicycle rim of claim 10 wherein said structural fibers of said ply composite material are woven, with weft and warp directions forming an angle of substantially 45° with the circumferential direction.

22. The bicycle rim of claim 10 wherein said structural fibers of said ply composite material are randomly arranged within said polymeric material.

23. The bicycle rim of claim 1 wherein the first layer defines an outer surface of a body region of the bicycle rim and the wings of the bicycle rim, and the second layer defines an inner surface of a tire coupling channel.

24. The bicycle rim of claim 1 wherein said structural fibers are selected from the group consisting of carbon fibers, glass fibers, boron fibers, aramidic fibers, ceramic fibers and combinations thereof.

25. The bicycle rim of claim 1 wherein said polymeric material is a thermosetting resin.

26. The bicycle rim of claim 1 wherein the reinforcement element is comprised of multiple segments and forms a substantially circular shape.

27. The bicycle rim of claim 26 wherein each of the reinforcement elements comprises multiple segments having ends that overlap with an adjacent segment.

28. The bicycle rim of claim 27 wherein each of the reinforcement elements is substantially parallel to another, and the overlapping ends are offset from one another.

29. A bicycle rim comprising a first, a second, a third, and a fourth layer of composite material comprising structural fibers incorporated in a polymeric material,
the first and second layers being joined with each other at a portion that forms a first wall of the rim, the second and the third layers being joined with each other at a portion that forms a second wall of the rim, the third and fourth layers being joined with each other at a portion that forms a third wall of the rim, and the fourth and first layers being joined with each other at a portion that forms a fourth wall of the rim,
the first, second, third, and fourth layers defining therebetween a space where the first, second, third, and fourth walls meet,
the space enclosing a circumferentially extending reinforcement element of unidirectional structural fibers.

30. The bicycle rim of claim 29, wherein the circumferentially extending reinforcement element is substantially rhomboidal-shaped in cross-section.

31. A bicycle rim comprising:
a first layer of composite material comprising structural fibers incorporated in a polymeric material that defines a radially inner surface of a body region and wings of the rim,
a third layer of composite material comprising structural fibers incorporated in a polymeric material, that defines an inner surface of a tire coupling channel, and
a second layer of composite material comprising structural fibers incorporated in a polymeric material, that defines an inner surface of a substantially closed inner circumferential chamber,
wherein the first and second, second and third, and first and third layers run parallel at respective portions thereof, and diverse at respective portions thereof, so as to define at least one space that encloses at least one circumferentially extending reinforcement element of unidirectional structural fibers, the diverging portions of each of the first, second, and third layers defining a respective outer boundary of the space.

32. A bicycle rim comprising:

a first layer of structural fibers incorporated in a polymeric material that forms a first exterior wall;

a second layer of structural fibers incorporated in a polymeric material that forms an interior chamber and joins with the first layer to form the first exterior wall;

a third layer of structural fibers incorporated in a polymeric material that forms a second exterior wall and joins with the first and second layers;

the first, second and third layers are joined so that the second layer forms a base extending between the first and third layers; the first and third layers are joined to form connecting walls over the base formed by the second layer with the result that the joined layers each define a respective section of a boundary of a space that encloses a circumferentially extending reinforcement element of unidirectional structural fibers.

33. A composite material bicycle rim comprising:

at least three layers of structural fibers incorporated in a polymeric material that define a plurality of walls and at least one intersections among at least three walls of the plurality of walls, wherein each of the layers defines a respective side bounding a circumferential space at the intersection, and having circumferentially extending unidirectional structural fibers embedded in a gluing substance that is a different material from the polymeric material.

34. The bicycle rim of claim 33 wherein the gluing substance has an elongation at break coefficient higher than that of the polymeric material.

35. The bicycle rim of claim 33 wherein the gluing substance has an intralaminar shear strength higher than that of the polymeric material.

36. The bicycle rim of claim 31, wherein the first and third layers run parallel to define radially extending sidewalls having the wings.

37. A bicycle rim comprising:

first, second, and third layers of composite material that define the rim's structure and a circumferentially extending enclosed space in the structure;

the first and second layers have portions that are parallel with each other and portions that diverge from each other such that the diverging portions of the first and second layers form two boundaries of the circumferentially extending enclosed space;

the third layer has portions that are parallel with the first and second layers respectively and a portion between those parallel portions that diverges from both the first and second layers and forms a third boundary of the circumferentially extending enclosed space, so that the circumferentially extending enclosed space is enclosed by the three boundaries; and a circumferentially extending reinforcement element of unidirectional structural fibers within the circumferentially extending enclosed space.

38. A bicycle rim made of composite material comprising structural fibers incorporated in a polymeric material, the rim comprising a plurality of walls; at least one intersection where at least one wall intersects at least one other wall; a gluing substance different from the polymeric material of the composite material; and at least one circumferential reinforcement element having circumferentially extending unidirectional structural fibers embedded in the gluing substance and extending at the at least one intersection of the walls of the rim.

39. A bicycle rim made of composite material comprising structural fibers incorporated in a polymeric material, the rim comprising a plurality of walls; at least one intersection where at least one wall intersects at least one other wall; a gluing substance different from the polymeric material of the composite material; and at least one circumferential reinforcement element having circumferentially extending unidirectional structural fibers incorporated in a polymeric material and embedded in the gluing substance and extending at the at least one intersection of the walls of the rim.

* * * * *